US008532137B1

(12) United States Patent
Afferton et al.

(10) Patent No.: US 8,532,137 B1
(45) Date of Patent: Sep. 10, 2013

(54) NETWORK ARCHITECTURE FOR A PACKET AWARE TRANSPORT NETWORK

(75) Inventors: Thomas Scott Afferton, Centreville, VA (US); Luis Aguirre-Torres, Holmdel, NJ (US); Robert Duncan Doverspike, Tinton Falls, NJ (US); Charles Robert Kalmanek, Jr., Short Hills, NJ (US); Kadangode K. Ramakrishnan, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1254 days.

(21) Appl. No.: 10/810,326

(22) Filed: Mar. 26, 2004

Related U.S. Application Data

(60) Provisional application No. 60/320,054, filed on Mar. 26, 2003.

(51) Int. Cl.
*H04J 3/16* (2006.01)
(52) U.S. Cl.
USPC ............................................ 370/466; 370/442
(58) Field of Classification Search
USPC .......................................... 370/401, 465–467
See application file for complete search history.

(56) References Cited

U.S. PATENT DOCUMENTS

| 5,982,746 | A  | * | 11/1999 | Hanson et al. ................. 370/220 |
| 6,240,086 | B1 | * | 5/2001  | Morgan et al. ................. 370/352 |
| 6,690,683 | B1 | * | 2/2004  | Brunheroto et al. .......... 370/542 |
| 6,987,757 | B1 | * | 1/2006  | Akiyama et al. ............... 370/353 |
| 7,145,902 | B2 | * | 12/2006 | Schindler et al. .............. 370/352 |
| 7,184,427 | B1 | * | 2/2007  | Carew et al. ................... 370/352 |
| 2003/0091032 | A1 | * | 5/2003  | Laxman et al. ................ 370/352 |
| 2003/0147379 | A1 | * | 8/2003  | Elias ............................... 370/352 |
| 2003/0152028 | A1 | * | 8/2003  | Raisanen et al. .............. 370/235 |
| 2003/0235198 | A1 | * | 12/2003 | McElroy et al. ............. 370/395.5 |
| 2004/0158299 | A1 | * | 8/2004  | Patrias ............................ 607/60 |
| 2004/0170167 | A1 | * | 9/2004  | Cohen ............................ 370/389 |
| 2004/0190547 | A1 | * | 9/2004  | Gordy et al. ................... 370/463 |
| 2005/0025177 | A1 | * | 2/2005  | Huckett et al. ................ 370/466 |
| 2005/0074017 | A1 | * | 4/2005  | Qian et al. ..................... 370/401 |

* cited by examiner

*Primary Examiner* — Ayaz Sheikh
*Assistant Examiner* — Mounir Moutaouakil

(57) ABSTRACT

A method and architecture for Packet-Aware Transport Networks (PATN) which supports both packet and traditional TDM services and which leverages an assemblage of emerging technologies to provide efficient aggregation and switching of packet traffic in metro networks. The PATN provides significant cost savings to carriers by reducing the number of network elements, reducing transport costs through statistical multiplexing, and eliminating the need for redundant multiplexing operations.

18 Claims, 8 Drawing Sheets

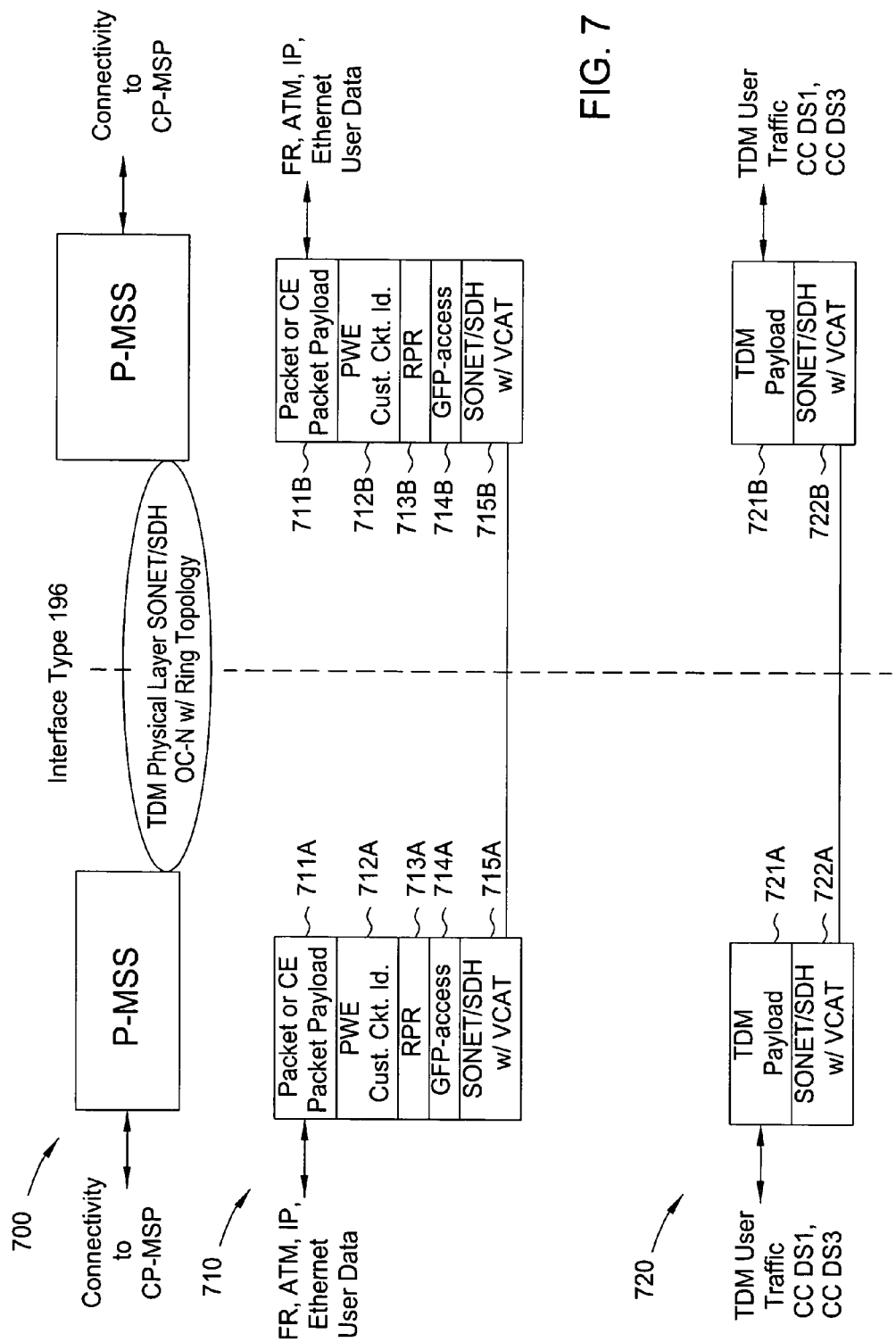

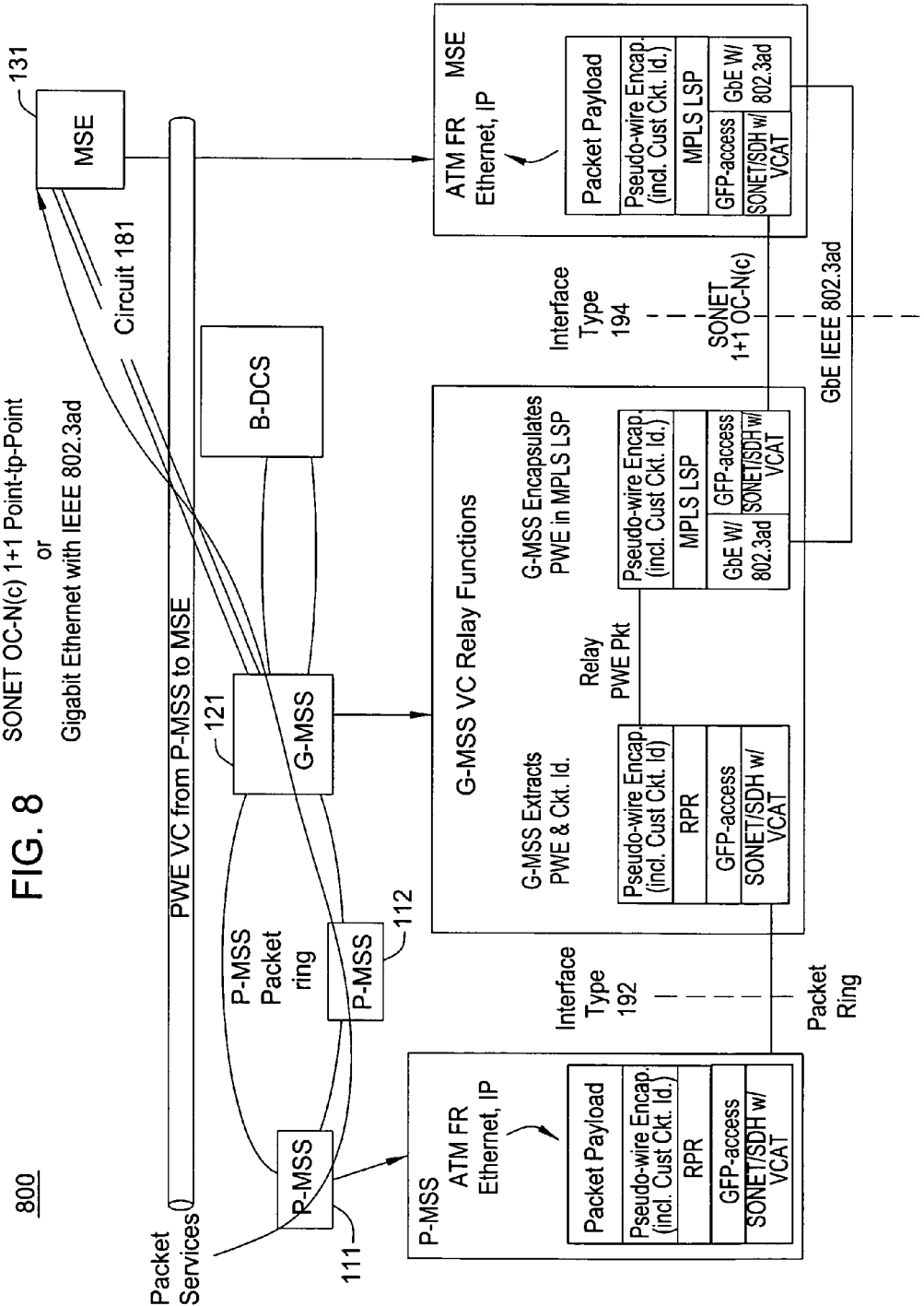

NETWORK ARCHITECTURE FOR A PACKET AWARE TRANSPORT NETWORK

This application claims the benefit of U.S. Provisional Application No. 60/320,054 filed on Mar. 26, 2003, which is herein incorporated by reference.

The present invention relates generally to communication networks and, more particularly, to a network architecture, systems, and interfaces to efficiently transport data packet traffic within a metropolitan area network and between a metropolitan area network to a core backbone network.

BACKGROUND OF THE INVENTION

Today's metro networks have evolved from the need to support traditional voice and private line services and, as a result, were optimized to support Time Division Multiplexing (TDM) services. However, the growth of private line services is dominated by access (also called "backhaul") to packet switches that provide Frame Relay, ATM, IP and Ethernet services. In addition, the dominant link layer used in enterprise networks is Ethernet. Since Ethernet interfaces to network equipment have historically been significantly less expensive than TDM interfaces of similar bandwidth, enterprise customers have an incentive to deploy Ethernet interfaces to their network service provider. TDM interfaces do not lend themselves to efficient transport of bursty packet data, since they have to be provisioned statically to carry the peak traffic and must use the coarse bandwidth granularity offered by the TDM multiplexing hierarchy. Because of the strict partitioning of bandwidth, the current TDM network structure has some obvious limitations:

The metro network has many points where circuits are subject to TDM multiplexing and de-multiplexing. Transport networks have evolved to this structure because the TDM multiplexing hierarchy creates circuit bundles at different rates and it is necessary to demultiplex them to the individual circuits and then to aggregate circuits going to the same destination in order to achieve high link utilization. Three types of Digital Cross-connect Systems (DCSs) have been developed to handle this task, i.e., Narrowband, Wideband, and Broadband DCSs cross connect signals at the DS0, DS1 (or SONET VT-1.5 rate), and DS3 (or SONET STS-1) rate respectively;

There may be many other packet access circuits along the path of a typical circuit, but because of the TDM encapsulation, the network cannot take advantage of statistical multiplexing across these access circuits;

The customer has only a coarse granularity of bandwidths from which to choose, based on the historical TDM multiplexing hierarchy (DS1, DS3, etc.). Thus, customers must purchase a TDM access circuit large enough to accommodate their peak demand, even if this means running it at low utilization;

Packet switches and routers must support channelized TDM interfaces that can demultiplex down to low rates. These functions consume precious space on customer-facing interface cards, which reduces the space for the packet processing and queueing functions that must be performed on these cards. This ultimately increases network cost;

Demand for Ethernet interfaces is growing. To provide Ethernet service in the present network, packets are encapsulated into TDM circuits and homed to a packet or Ethernet switch at the gateway office (a "hub and spoke" architecture). This is an inefficient method to provide Ethernet services.

Therefore, a need exists for a Packet Aware Transport Network (PAIN) architecture to provide more efficient support for packet services, while continuing to support existing TDM interfaces and service capabilities within a metropolitan area.

SUMMARY OF THE INVENTION

In one embodiment, the present invention includes a network architecture, systems, and interfaces to provide an efficient packet transport network supporting both packet and traditional TDM services within a metropolitan network and between a metropolitan network and the core backbone network. The present invention addresses the aforementioned limitations associated with TDM transport supporting packet services and provides a much more efficient and cost effective network architecture through the use of more intelligent systems with packet level awareness, features, and functionalities.

BRIEF DESCRIPTION OF THE DRAWINGS

The teaching of the present invention can be readily understood by considering the following detailed description in conjunction with the accompanying drawings, in which:

FIG. 7 illustrates a protocol block diagram of an interface between a P-MSS and another P-MSS; and FIG. 8 illustrates a protocol block diagram of a PWE virtual circuit flow between a P-MSS and a MSE.

To facilitate understanding, identical reference numerals have been used, where possible, to designate identical elements that are common to the figures.

DETAILED DESCRIPTION

Most metro telecommunications transport carriers interface with customer equipment (routers, servers, voice switches, etc.) via the legacy TDM signal rates (DS0, DS1, DS3, SONET OC-3, OC-12 in North America). This is due to historical evolution of digital transmission rates and the fact that the SONET standard specifies adaptation of these particular rates. The services offered by metro carriers are classified into five broad classes: private line, packet network access, Ethernet (two varieties) and voice access. Private line is TDM transport of a signal at the above rates between two customer (or other carrier) interfaces. Packet network access is transport of packets between a customer interface and packet network service that is provided by the same or another carrier. Ethernet point-to-point connections are a virtual circuit service, usually between two Ethernet interfaces at different customer locations. Ethernet transparent LAN service is a multipoint-to-multipoint service supporting virtual LAN bridging based on IEEE 802 specifications among customer sites. Voice access can be TDM DS0-based access to voice switches or Voice-over-IP (VoIP). Today's metro networks have evolved to transport private line and voice TDM services, but are limited in their ability to efficiently serve packet network access and Ethernet-based services.

To address this criticality, the present invention introduces a new metropolitan access network architecture, the PATN, to better support today's access needs of packet traffic originated and terminated in the metropolitan area in addition to satisfying the traditional TDM traffic access needs. The architecture of the PAIN allows a service provider to:

reduce the number of gateway network elements;
simplify the transport architecture;
leverage more efficient and cost-effective interfaces to packet switches;
enable a scalable transition to emerging packet-based services and customer Ethernet interfaces;
continue to support TDM customer interfaces and existing TDM services.

The present invention relates to communication networks. These networks include, but are not limited to, those that provide support of TDM, ATM, Frame Relay, Ethernet, and IP service transport within a metropolitan network or between a metropolitan network and the core backbone network.

These networks consist of a number of different types of network devices connected by communication links. There could be multiple links between a given pair of devices and not every pair of devices needs to be connected to each other. Links could be of various sizes that are generally expressed in bandwidth units such as DS1, DS3, OC3, OC12, OC48, etc. The topology of these networks can be either ring based or mesh based. In such networks, circuits are provisioned between pairs of customer end points and numerous classes of services are supported within the network.

Figure 1:
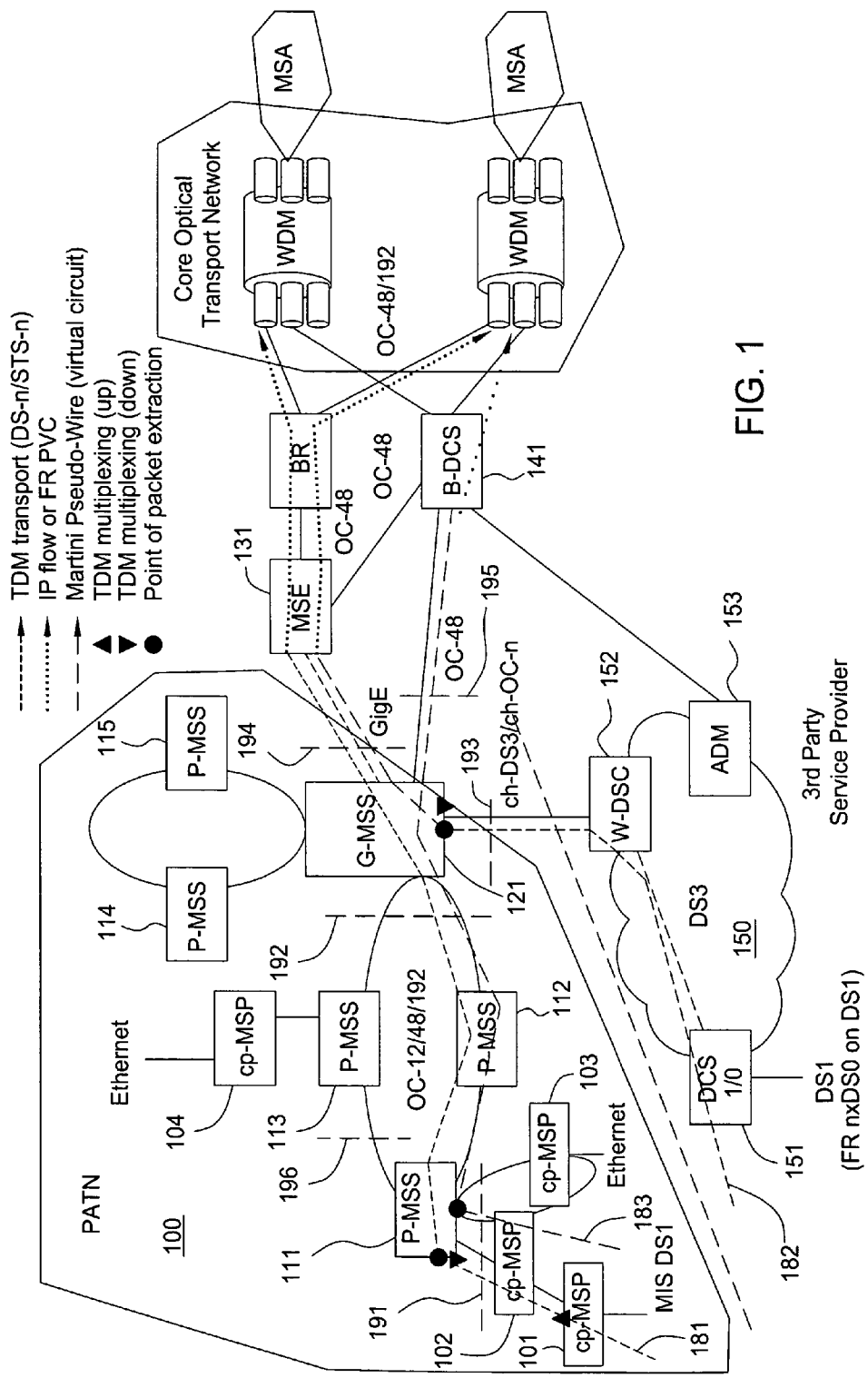
FIG. 1 illustrates an overall network architecture of an embodiment incorporating one or more aspects of the present invention.

To better understand the present invention, a description of the components of the PATN network architecture is provided in FIG. 1. FIG. 1 shows an exemplary communication network architecture 100 in one embodiment of the present invention. The PATN network architecture 100 comprises a plurality of Customer Premise—Multi-Service Platform (CP-MSP) 101-104, a plurality of Packet—Multi-Service Switch (P-MSS) 111-115, a Gateway—Multi-Service Switch (G-MSS) 121, a Multi-Service Edge (MSE) 131, a Broadband—Digital Cross-connect System (B-DCS) 141, and a third party provider's TDM access network 150 further comprising various types of TDM grooming devices 151-153. The network architecture 100 further comprises a plurality of interface types, CP-MSP to P-MSS interface 191, P-MSS to G-MSS interface 192, TDM access to G-MSS interface 193, G-MSS to MSE interface 194, G-MSS to B-DCS interface 195, and P-MSS to P-MSS interface 196.

A PATN in a metro area is connected to other metro areas over inter-city packet and transport backbone networks. The PATN provides aggregation and transport of TDM and packet traffic from multiple central offices in the metro area into a large gateway central office containing a Gateway Multi-Service Switch (G-MSS). The G-MSS hands off packet traffic to a Multi-Service Edge platform (MSE) which connects to the inter-city packet backbone network. The inter-city packet backbone is assumed to be a converged, multi-service packet network based on Multi Protocol Label Switching (MPLS). For example, the MSE may support Frame Relay, ATM, IP and Ethernet services. The G-MSS hands off TDM traffic to a B-DCS which connects to an inter-city transport network.

Each office in the PATN contains one or more Packet-aware Multi-Service Switches (P-MSS's) which interface to customers and/or other carriers. TDM and packet traffic between P-MSS's or from P-MSS's to the G-MSS are carried over metro access rings that terminate on the G-MSS. The PATN supports both electrical interfaces (e.g., DS3) and optical interfaces (e.g., OC-n, GigE) to customers and other carriers. In particular, customers may interface to a Customer Premise Multi-service Platform (CP-MSP) that connects to the P-MSS via a packet-aware interface, a dedicated TDM circuit or a customer access ring. Access rings to customers and between P-MSS's are typically SONET OC-n rings. Packet traffic can be carried over the metro access rings using a number of different approaches. For example, the P-MSS's may support the IEEE 802.17 Resilient Packet Ring (RPR) protocol, either on top of a dedicated OC-n physical layer or in a "cutout" consisting of a Virtual Concatenation Group (VCG) of N STS-1s as part of a larger Synchronous Optical Network (SONET) pipe.

The PATN simplifies the overall network architecture by eliminating the need to multiplex and de-multiplex TDM channels multiple times and by reducing the total number of network elements. P-MSS and G-MSS nodes de-multiplex TDM channels down to the lowest granularity TDM channel that is needed to extract and switch ("groom") the embedded TDM channels. Since this may require de-multiplexing a high rate SONET OC-n interface all the way down to DS0, this is referred to as deep channelization. The PATN aggregates the functions of the Wideband-DCS, Narrowband-DCS and the ring interface of the ADMs in a typical TDM-based access network into the G-MSS. This aggregation of multiple cross-connect functions into one high-capacity platform has become feasible as a result of the improvements in the level of integration possible in silicon.

The PATN takes advantage of the emerging approach of converging to a single MPLS-based multi-service backbone network, especially in the case of a single carrier for both the metro and backbone networks, by handing all of the metro/access packet traffic to a single MSE platform, shown in FIG. 1. Capitalizing on the integration of the Frame relay, ATM and IP edge functions into a single MSE platform allows the ability to aggregate traffic from multiple services on to a single large-capacity link between the PAIN and the MSE and achieve high utilization on that link.

The PATN takes advantage of the Pseudo-Wire Encapsulation (PWE) work ongoing in the IETF to establish virtual circuits (VCs) from the P-MSS to the MSE. The PWE enables the PATN to identify traffic originating from or destined to a particular customer port on the P-MSS. The PATN multiplexes traffic from multiple PWE virtual circuits over the P-MSS ring to get the benefit of statistical multiplexing, and thus much more efficient transport of packet traffic to the MSE. This positions the network to enable more efficient transport of emerging Ethernet services. For example, Ethernet services can be transported in the rings themselves as virtual circuits (for example over RPR) or via the G-MSS if they need to route inter-ring or over the core to a distant metro area. As can be seen in FIG. 1, the typical "hub and spoke" architecture and the dedicated Ethernet switch of today's network are replaced with much simpler and efficient intra-ring packet virtual circuits.

While the PATN enables a carrier to provide a more efficient packetized transport in the metro/access environments, the present architecture needs to ensure that legacy interfaces are retained. This is reflected in FIG. 1, where the interface to another carrier ($3^{rd}$ Party Service Provider) is shown, who may still have the traditional TDM infrastructure, interfacing to the PAIN. The G-MSS provides the traditional TDM interface to the other service provider. In this scenario, the packet extraction and deep channelization functions are performed at the G-MSS.

In order to support the PAIN network architecture, the following key network capabilities need to be supported:

Deep channelization: packet traffic is extracted from TDM channels once, on entering the PAIN;

Idle packet suppression (IPS): the link layer encapsulation of packet-over-TDM transport is terminated, allowing idle packets to be suppressed;

Pseudo Wire Encapsulation: packet payloads are encapsulated and virtual circuits are created and switched through the PATN up to the MSE to transport user packet payload;

Statistical multiplexing: IPS and aggregation of virtual circuits allows statistical multiplexing to occur, especially at the interface with the MSE;

Distributed grooming: de-multiplexing and switching ("grooming") of TDM traffic is distributed among PATN nodes, using either circuit emulation or low-order SONET or SDH Virtual Concatenation (LO-VCAT) for TDM transport.

Deep Channelization and Idle Packet Suppression—

Deep channelization allows packet traffic that is embedded in TDM channels to be extracted, encapsulated and switched through the PATN. For example, existing customer TDM traffic often enters an add/drop port of an ADM today at the DS3 rate. The DS3 can be clear-channel or channelized, in which case it consists of multiplexed DS1s (each of which may be clear channel or channelized with DS0s). The channelized DS3 is created by customer premise or carrier-owned TDM multiplexing equipment. As stated previously, the PATN architecture continues to support existing TDM interfaces and services, such as DS3 transport. However, in a PAIN, when the P-MSS interfaces to a channelized DS3, it de-multiplexes the DS1 and DS0 channels contained in the DS3 to extract packets from channels that are provisioned for packet-network access. Other channels are provisioned to indicate that they will be transported as TDM circuits through the PAIN.

Specifically, for packet-access circuits, the P-MSS terminates the link layer protocol carried on the TDM channel, strips idle packets, and encapsulates each packet onto a PWE virtual circuit for switching. Packet-over-SONET (POS) encapsulation is commonly used today to interconnect routers over SONET transport. Packets are encapsulated in an HDLC frame, which are delineated by a flag byte. However, since packet traffic is generally not constant bit-rate, empty frames (consisting of only flag bytes) are inserted to match the bit rate of the TDM signal. The Point-to-Point Protocol (PPP) is used for link management between the customer interface and edge switch (e.g., PPP provides "hello" messages to indicate if the link is up or down). When doing Idle Packet Suppression (IPS), the P-MSS discards the empty frames. Since most packet access circuits have very low average fill (especially for lower rate circuits such as DS1), IPS and aggregation of virtual circuits provides substantial opportunity for statistical multiplexing. As outlined in this invention, the use of packet extraction and Idle Packet Suppression at the earliest point in the network, at the edge of the PAIN and transporting only the data packets, enables the PATN to gain advantages from statistical multiplexing when carrying bursty data.

The use of IPS and virtual circuits in the PATN provides exactly the same service interface as today's Packet-over-SONET access links and is transparent to the customer. For example, the PPP protocol is also encapsulated and delivered to the MSE. Thus, existing service interfaces are maintained while providing the opportunity for significant efficiency improvement for the carrier, as discussed below.

Protocol Layering—

This addresses the protocol layers in the PATN and across the interface to the MSE. Service transparency (transparent support for existing services over the PATN), scalability (efficient support for large numbers of customer ports and the ability to evolve a rich access network topology) and reliability are important characteristics met by the present protocol framework.

FIG. 8 shows one example of the simplified protocol layers, focusing on support for packet traffic within a PATN. In the figure, the physical layer for the metro rings continues to use SONET framing, although other options (such as Gigabit Ethernet or 10 Gigabit Ethernet) are also possible. SONET Virtual Concatenation (VCAT) is used to carve out a portion of the channel capacity for packet traffic, and Generalized Framing Protocol (GFP) provides packet framing. The IEEE 802.17 Resilient Packet Ring (RPR) provides medium access control for the packet aware nodes on the metro/access rings. The remainder of the protocol stack defines the framework for transport and switching packets between the P-MSS where they are extracted and the MSE. The interface between the G-MSS and MSE can be OC-n (POS). However because of the Layer 2 packet framework, a Gigabit Ethernet interface between G-MSS and MSE can be used and link aggregation, as defined in IEEE 802.3ad, can be used to provide protection capabilities equivalent to today's 1:1 SONET.

The Pseudo-Wire Encapsulation standards define encapsulation formats for the common Layer 2 protocols, such as Frame Relay, ATM, and Ethernet, for transport over an MPLS label switched network. Thus, the PATN architecture represents a new application of the PWE to metro access networks. Note that the MSE terminates the pseudo-wire from the PATN and performs the appropriate service-specific functions. In some cases, for example a Frame Relay service, the MSE may re-encapsulate the packet in another pseudo-wire for delivery across the MPLS network once the service-specific functions have been performed. P-MSSs provide relatively simple aggregation, transport and switching functions and do not interpret the service-specific headers in each packet. The protocols used in the PATN will be discussed in more detail below.

Layer 3 (IP) and Layer 2 traffic (e.g., Frame Relay, ATM (including PVC, SVC and Point-to-MultiPoint connections) and Ethernet (point-to-point and multipoint-to-multipoint Transparent LAN Services (TLS))) packets are encapsulated on a virtual circuit using PWE, as shown in FIG. 8. Since the P-MSS and G-MSS nodes do not do Layer 3 forwarding, transport of IP packets within the PATN may require a new code point to be defined for the PWE. The virtual circuit between the P-MSS and the MSE has an associated Class of Service that carries traffic from a customer port on the P-MSS to the MSE. The P-MSS detects Layer 2 packet framing and encapsulates the packets in a service-specific PWE. The Layer 2 virtual circuits are "port mapped" i.e., contain all traffic associated with the P-MSS port. The MSE performs a look-up based on the VC label to determine the appropriate service function to be performed for the packet. The label is also used in the reverse direction to enable the appropriate de-multiplexing of incoming packets from the backbone at the MSE before being forwarded to the destination P-MSS port.

Each flow going between the P-MSS and the MSE receives Class of Service (CoS) treatment with the traffic subject to the appropriate policing and shaping. Since there may be limits on the number of policers and shapers that can be cost effectively implemented in P-MSS, G-MSS or MSE nodes, the present invention allows aggregation of the virtual circuits into a larger aggregate between the G-MSS and MSE with respect to CoS treatment. This larger aggregate consists of a set of virtual circuits, possibly from different P-MSSs, which are encapsulated in a single MPLS label switched path (LSP) between the G-MSS and MSE. While each LSP may carry multiple virtual circuits from different P-MSSs, the virtual circuit is only terminated at the MSE, where service-layer functions are performed. The MSE still needs to perform a lookup on the VC label to determine the appropriate service-specific functions to be performed, but the MSE is only required to have a policer/shaper per LSP, thus reducing the number of CoS contexts it has to maintain. This is the right tradeoff since VC lookup is a function that scales much more easily than policer/shaper state.

MSE Interface and Statistical Multiplexing—

Carriers can take advantage of statistical multiplexing in the PATN to make more efficient use of transport capacity. This is particularly evident in two areas. First, the metro-ring portion of the network will use less transport capacity because of early conversion to packets in the access network and the resulting benefit from statistical multiplexing. Second, the interface to the MSE will become more cost-efficient because a packet-based interface to the MSE is more efficient than the hardware-based TDM deep-channelization functions needed in today's network. This results in significant simplification to the MSE interface cards and consequent improvement in density due to reductions in size and power. The statistical multiplexing gain by the MSE within a PATN will allow a service provider, when compared to the traditional TDM network structure, to carry the same volume of packet access services, as the traditional TDM network structure but with statistical multiplexing gain efficiencies. These statistical multiplexing gains also translate into significant cost savings of the MSE customer-facing line cards, which, for most carriers, comprise the predominate costs of the MSE. Alternatively, the same size/cost of MSE can evolve to support a large number of customers per physical port than with the current TDM network structure. In fact, this change is an easy implementation for most routers: to process the packets from a customer physical access port in today's network, the customer-facing card processes the (arriving) payload of the TDM access link through a TDM demultiplexer and de-framer which extracts the payload and then de-frames the packets (e.g., de-frames the PPP/HDLC). After the de-encapsulation function is done, the packets are interfaced to a virtual port in a packet engine, wherein the port characteristics are defined and the packets processed (queueing, policing, class of service, etc.). With the MSE packet interface in the PATN, each customer access port is identified by a distinct virtual circuit, as described previously. It is a simple process to extract the packets from the encapsulation (the TDM demultiplexing, precise channel timing, and de-framing is eliminated) and map them to a virtual port; thus manufacturers of an MSE can develop and use the same packet engines as they would for a channelized TDM interface.

Transport of TDM Services—

The PAIN architecture allows a range of implementation alternatives for P-MSS and G-MSS vendors and several options for transporting TDM traffic across metro access rings. Since P-MSS nodes implement deep channelization, the de-multiplexing and switching of TDM channels is distributed throughout the PAIN. One option for the transport of TDM traffic uses circuit emulation to carry TDM traffic through a packet-only access network. In this case, (following one direction of transmission) the P-MSS extracts embedded TDM channels, encapsulates the TDM payload in a format supporting circuit emulation, and switches encapsulated packets through the PAIN with the appropriate quality of service. The G-MSS converts the packets back to TDM and multiplexes the TDM channels onto a channelized TDM interface to the B-DCS (FIG. 1). In this case, RPR is a possible effective packet transport implementation for metro access ring and P-MSS and G-MSS nodes might contain a packet switching fabric. A second option subdivides the capacity on the metro access rings using a "cutout" for the packet traffic, as mentioned earlier. Here, SONET Virtual Concatenation is used to allow packet traffic to be carried in a subset of the STS-1s, with TDM traffic carried in the remaining STS-1s. There is a range of further sub-options for transport and switching of TDM traffic based on the fabric structure of the P-MSS and G-MSS. For example, both the P-MSS and G-MSS might contain both packet and TDM fabrics, with the TDM fabric supporting TDM grooming down to at least VT1.5 or DS0 granularity.

Resilient Packet Ring (RPR)—

A technology suitable for carrying both packet traffic and constant bit rate traffic on the metro access ring is the Resilient Packet Ring (RPR) protocol being developed in the IEEE 802.17 working group. It is a Medium Access Control protocol designed for dual counter-rotating metro access rings that can potentially replace traditional SONET rings. Nodes on an RPR ring transport frames from a source to a destination node by encapsulating the user payload with an RPR header. RPR supports spatial re-use, which increases overall network capacity by enabling multiple sources to send traffic to destinations simultaneously as long as their traffic does not use the same span (a link between neighboring nodes). One of the salient features of RPR is its SONET-like restoration speed. Two flavors of restoration on a link or node failure are provided: "steer" reroutes packets from source to destination around the opposite direction; "wrap" patches around the failed link (by looping back around the opposite ring). With RPR one can in practice gain higher utilizations than with traditional SONET implementations by using bandwidth that would be needed for restoration to carry lower priority traffic. If a failure occurs, the total available capacity will be overbooked due to the rerouting (wrap or steer), but the higher priority traffic will see no affect in a properly engineered system. SONET rings also allows the use of protection bandwidth, but it is never used in practice because of a variety of reasons, such as difficulties in disconnecting the circuits that route over the protection channels prior to protection switching.

To support a range of performance requirements, RPR defines three QoS classes: Class A, B and C, with strict priority between them. Class A supports traffic requiring bandwidth and jitter guarantees. ClassB supports traffic requiring bandwidth guarantees, specified as a committed information rate (CIR) and an excess information rate (EIR). Class C supports best effort traffic. These classes of service support services similar to those supported by the IETF Diffserv classes (e.g., EF, AF and BE classes.) As with other medium access control protocols, the RPR MAC aims to achieve high ring utilization while also ensuring fair access to the channel for contending sources. RPR also retains one of the important goals of any IEEE MAC—once a packet has been accepted by the MAC, it should not be subject to congestion loss. To achieve this, highly congested stations on an RPR ring give priority to transit traffic over traffic that is inserted at a local station. Nodes may implement a single transit buffer for all classes or dual transit buffers, with the primary transit buffer (PTQ) for Class A, and the secondary transit buffer (STQ) for ClassB and C. Class A traffic and the CIR portion of ClassB traffic are subject to admission control. Class C traffic and the EIR portion of ClassB traffic are considered to be "fairness eligible" (FE). RPR defines a fairness algorithm that allocates the available bandwidth among stations sending fairness eligible traffic under congestion. The MAC allows unused CIR from ClassB to be reclaimed for fairness eligible traffic. RPR uses a distributed congestion control algorithm described in RPR FA.

The realization and location details of the aforementioned features, functions, and capabilities will be further illustrated below in the context of each well-defined interface type between various types of network devices within a PATN.

Figure 2:
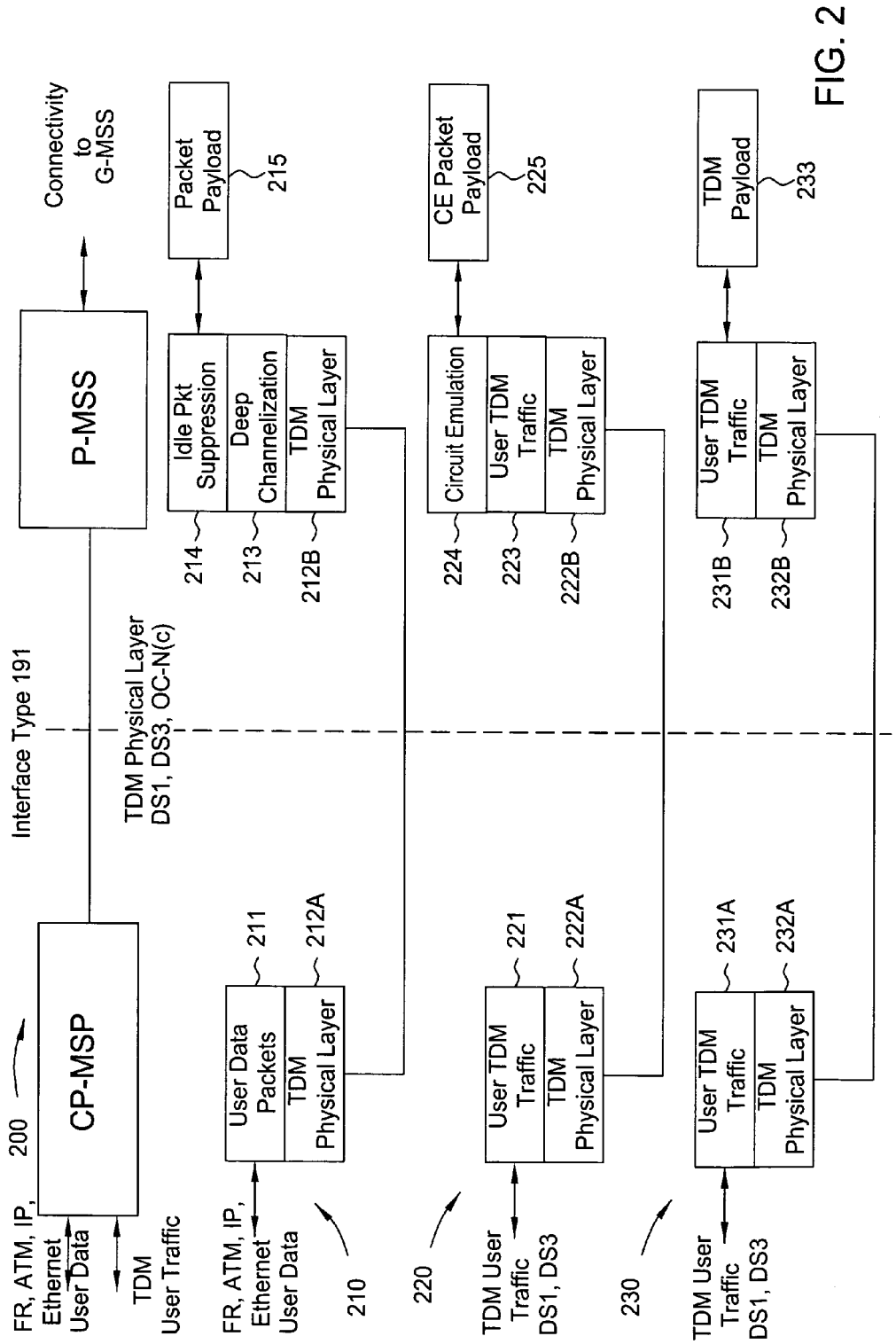
FIG. 2 illustrates a protocol block diagram of an interface between a CP-MSP and P-MSS.

FIG. 2, block diagram 200, shows the definition of interface type 191 between a CP-MSP and a P-MSS. This interface consists of a TDM interface, such as DS1, DS3, or OC-N(c), at the physical layer and carries either packet user data or traditional user TDM traffic. The CP-MSP typically supports one or more data or TDM interfaces on the customer facing side and supports a TDM interface on the network facing side of the device.

If interface 191 carries embedded user data packets 211, such as ATM, Frame Relay, Ethernet, or IP packets, embedded within a TDM physical layer 212A in the direction from the CP-MSP to the P-MSS, the P-MSS will terminate the TDM physical layer 212B and perform packet extraction 213 to extract the user data packets by detecting service specific packet framing from such an interface and then performs idle packet suppression to discard idle packets 214 to produce a packet payload 215 for further processing by the P-MSS before it is forwarded to a G-MSS. In the reverse direction, the equivalent reverse functions are performed on this interface. The equivalent protocol stack of this scenario is shown in block diagram 210 in FIG. 2.

If interface 191 carries TDM user traffic 221, such as DS1 or DS3, using a TDM physical layer 222A in the direction from the CP-MSP to the P-MSS, the P-MSS will terminate the TDM interface 222B to extract the user TDM traffic payload 223 and then one option is that the CP-MSP performs circuit emulation function 224 on the TDM payload to produce a Circuit Emulated (CE) packet payload 225 for further processing by the P-MSS before it is forwarded to a G-MSS. In the reverse direction, the equivalent reverse functions are performed on this interface. The equivalent protocol stack of this scenario is shown in block diagram 220 in FIG. 2.

As another option, if interface 191 carriers TDM user traffic 231A, such as DS1 or DS3, using a TDM physical layer 232A in the direction from the CP-MSP to the P-MSS, the P-MSS will terminate the TDM interface 232B and extract the TDM user traffic 231B to produce a TDM payload 233 for further processing by the P-MSS before it is forwarded to a G-MSS. In the reverse direction, the equivalent reverse functions are performed on this interface. The equivalent protocol stack of this scenario is shown in block diagram 230 in FIG. 2.

Figure 3:
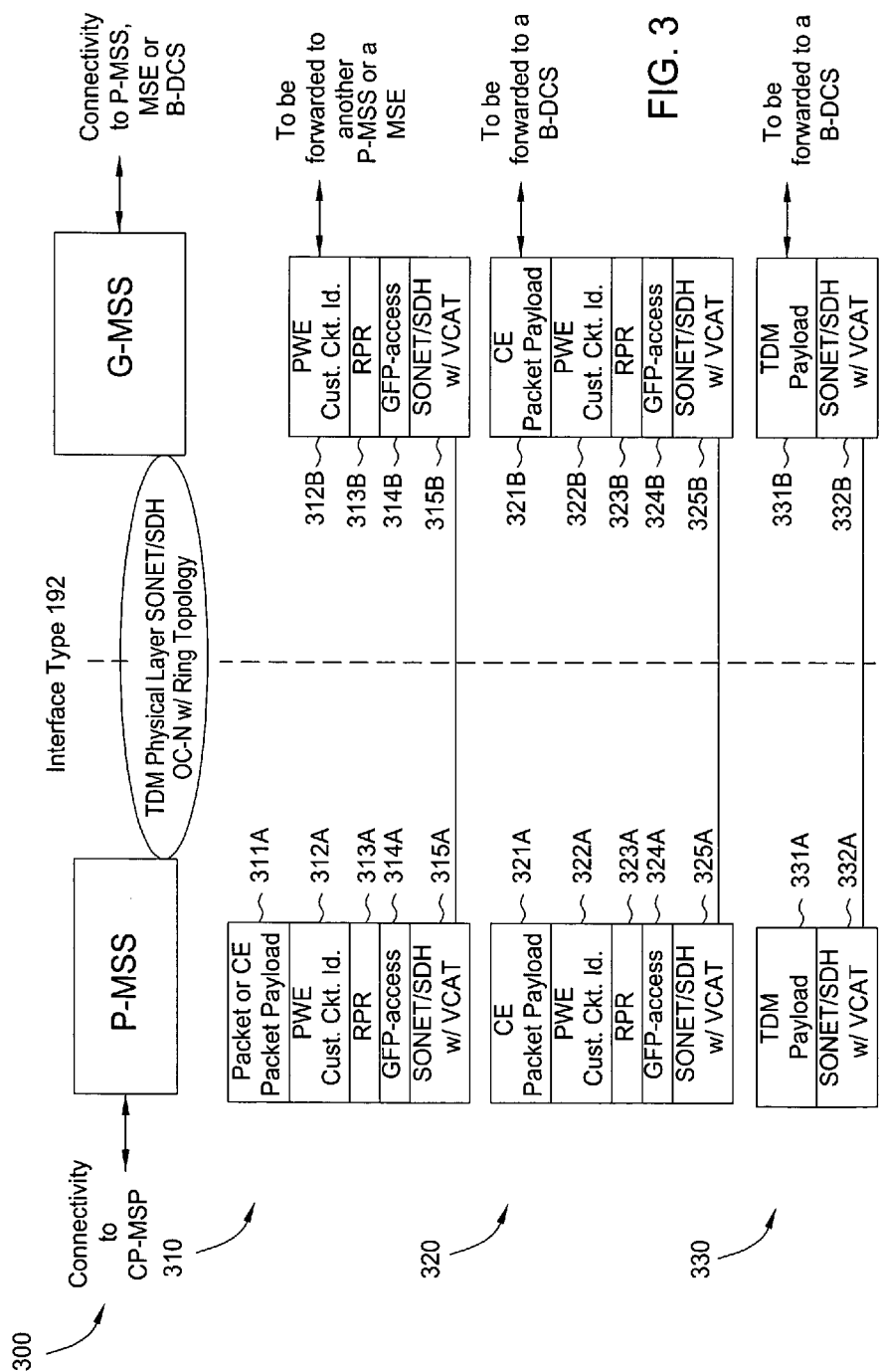
FIG. 3 illustrates a protocol block diagram of an interface between a P-MSS and G-MSS.

FIG. 3, block diagram 300, shows the definition of interface type 192 between a P-MSS and a G-MSS. This interface consists of a TDM interface, such as a SONET OC-N ring with virtual concatenation support, at the physical layer and carries either packet user data or traditional user TDM traffic. Although other instantiations are possible, RPR is used for the encapsulation and transport of the user data over the SONET ring in FIG. 2.

If interface 192 carries embedded data packet payload 311A, such as ATM, Frame Relay, Ethernet, IP, or circuit emulated (CE) TDM packets from a CP-MSP destined to another P-MSS or ATM, Frame Relay, Ethernet, or IP packets destined to a MSE, in the direction from the P-MSS to the G-MSS, the P-MSS performs pseudo wire encapsulation with customer circuit ID information 312A on the packet payload and then further encapsulates it into a RPR packet 313A and then further encapsulates it into a GFP based frame 314A and then further encapsulates it into a SONET physical layer with virtual concatenation support (VCAT) 315A. Once the user traffic arrives at the G-MSS, the G-MSS will terminate the SONET physical layer with VCAT support 315B and then extracts the GFP frames 314B and then extracts the RPR packet 313B and then produces the pseudo wire encapsulated packet with customer circuit ID information 312B for further processing by the G-MSS before it is forwarded to either another P-MSS or a MSE. Note that if the RPR bandwidth is restricted to completely occupy a standard SONET tributary size (e.g., STS-1/3/12/48/192) that VCAT may not be required. Note that the P-MSS originates a PWE virtual circuit (VC) when the PWE packet payload is formed and the VC is relayed at the G-MSS and then terminated at another P-MSS or an MSE eventually. In the reverse direction, the equivalent reverse functions are performed on this interface. The equivalent protocol stack of this scenario is shown in block diagram 310 in FIG. 3.

If interface 192 carries embedded CE packet payload 321A from a CP-MSP destined to a B-DCS, in the direction from the P-MSS to the G-MSS, the P-MSS performs pseudo wire encapsulation with customer circuit ID information 322A on the CE packet payload and then further encapsulates it into a RPR packet 323A and then further encapsulates it into a GFP based frame 324A and then further encapsulates it into a SONET physical layer with virtual concatenation support (VCAT) 325A. Once the user traffic arrives at the G-MSS, the G-MSS will terminate the SONET physical layer with VCAT support 325B and then extracts the GFP frames 324B and then extracts the RPR packet 323B and then extracts the pseudo wire encapsulated packet with customer circuit ID information 322B and then extracts the CE packet payload. The G-MSS then reassembles the original TDM stream (using a "play-out") buffer, then multiplexes the circuit along with other CE circuits into the proper higher rate SONET interface (such as OC-n) and then forwards these circuits to a B-DCS. Note that the P-MSS originates a PWE virtual circuit (VC) when the PWE packet is formed and the VC is terminated at the G-MSS. In the reverse direction, the equivalent reverse functions are performed on this interface. The equivalent protocol stack of this scenario is shown in block diagram 320 in FIG. 3.

If interface 192 carries TDM user traffic 331A using a TDM physical layer 332A in the direction from the P-MSS to the G-MSS, the G-MSS will terminate the TDM interface 332B to produce a TDM payload 331B for further processing by the G-MSS before it is forwarded to a B-DCS. In the reverse direction, the equivalent reverse functions are performed on this interface. The equivalent protocol stack of this scenario is shown in block diagram 330 in FIG. 3.

The P-MSS and the G-MSS can easily provide dual switching fabrics to support both packet and TDM traffic in the same system. For instance, the P-MSS and the G-MSS can use the protocol stack shown in 310 to support packet traffic and at the same time use the protocol stack shown in 330 to support TDM traffic. In fact, the P-MSS or the G-MSS can support all the protocol stacks 310, 320, and 330 in the same system if so desired.

Figure 4:
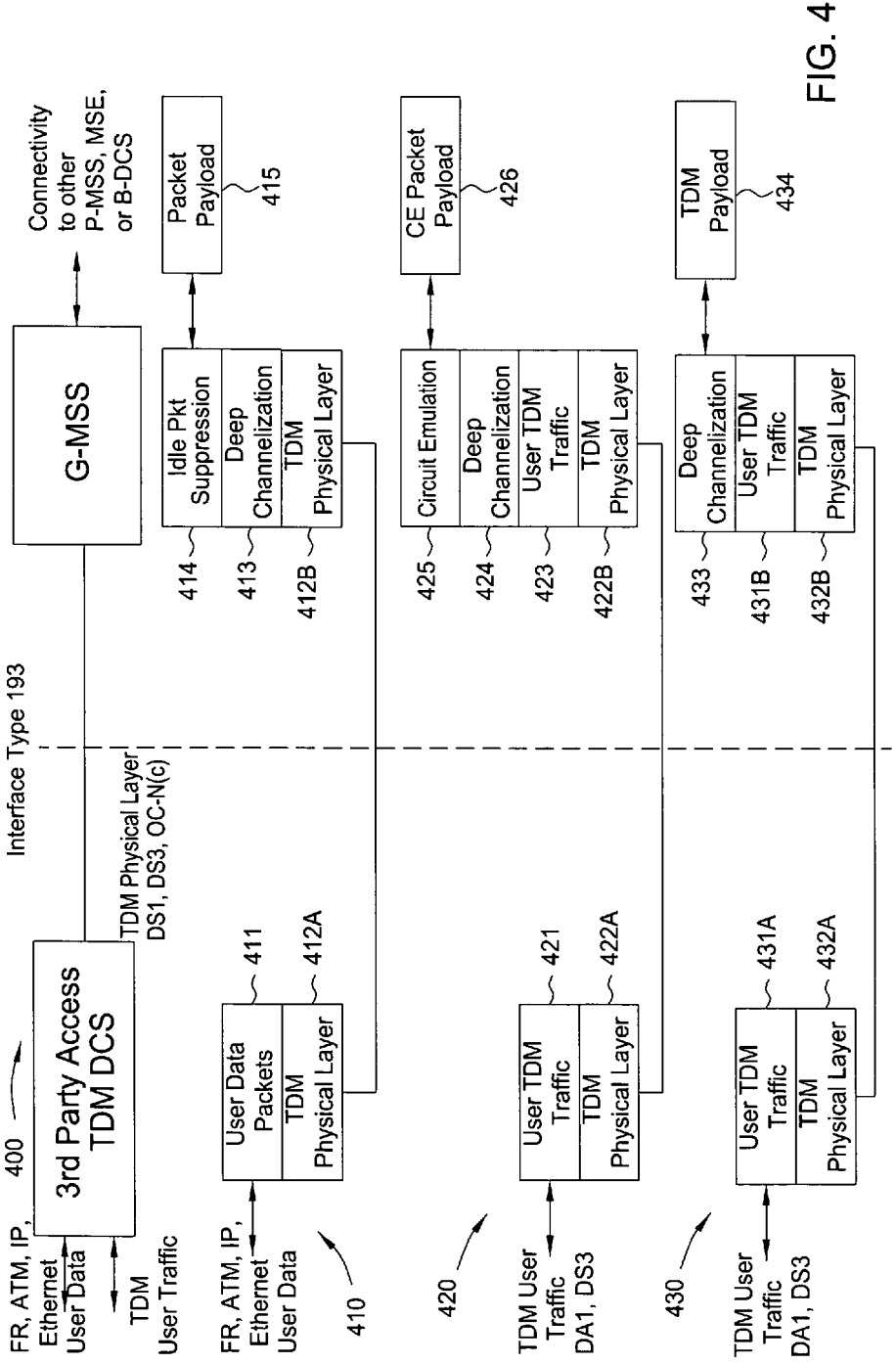
FIG. 4 illustrates a protocol block diagram of an interface between a third party TDM access and G-MSS.

FIG. 4, block diagram 400, shows the definition of interface type 193 between a third party TDM access network and a G-MSS. This interface consists of a TDM interface, such as DS1, DS3, and SONET OC-N(c), at the physical layer and carries either packet user data or traditional user TDM traffic.

If interface 193 carries embedded user data packets 411, such as ATM, Frame Relay, Ethernet, or IP packets, using a TDM physical layer 412A in the direction from the third party TDM access network to the G-MSS, the G-MSS will terminate the TDM physical layer 412B and performs deep channelization 413 to extract the user data packets by detecting service specific packet framing from such an interface and then performs idle packet suppression 414 to produce a packet payload 415 for further processing by the G-MSS before it is forwarded to a P-MSS or a MSE. In the reverse direction, the equivalent reverse functions are performed on this interface. The equivalent protocol stack of this scenario is shown in block diagram 410 in FIG. 4.

If interface 193 carries TDM user traffic 421, such a DS1 or DS3, using a TDM physical layer 422A in the direction from the third party TDM access network to the G-MSS, the G-MSS will terminate the TDM interface 422B to extract the user TDM traffic payload 423 and then performs deep channelization 424 to extract the lowest level TDM tributaries and then performs circuit emulation function 425 on the TDM stream to produce a Circuit Emulated (CE) packet payload 426 for further processing by the G-MSS before it is forwarded to a P-MSS (because the B-DCS is a traditional circuit-switched device, circuit emulation on the link to the B-DCS is generally not applicable). In the reverse direction, the equivalent reverse functions are performed on this interface. The equivalent protocol stack of this scenario is shown in block diagram 420 in FIG. 4.

Alternatively, if interface 193 carriers TDM user traffic 431, such as DS1 or DS3, using a TDM physical layer 432A in the direction from the third party TDM access network to the G-MSS, the G-MSS will terminate the TDM interface 432B and then extracts the original TDM user traffic 431B and then performs deep channelization 433 to extract the lowest level TDM tributaries to produce a TDM payload 434 for further processing by the G-MSS before it is forwarded to a B-DCS. In the reverse direction, the equivalent reverse functions are performed on this interface. The equivalent protocol stack of this scenario is shown in block diagram 430 in FIG. 4.

Figure 5:
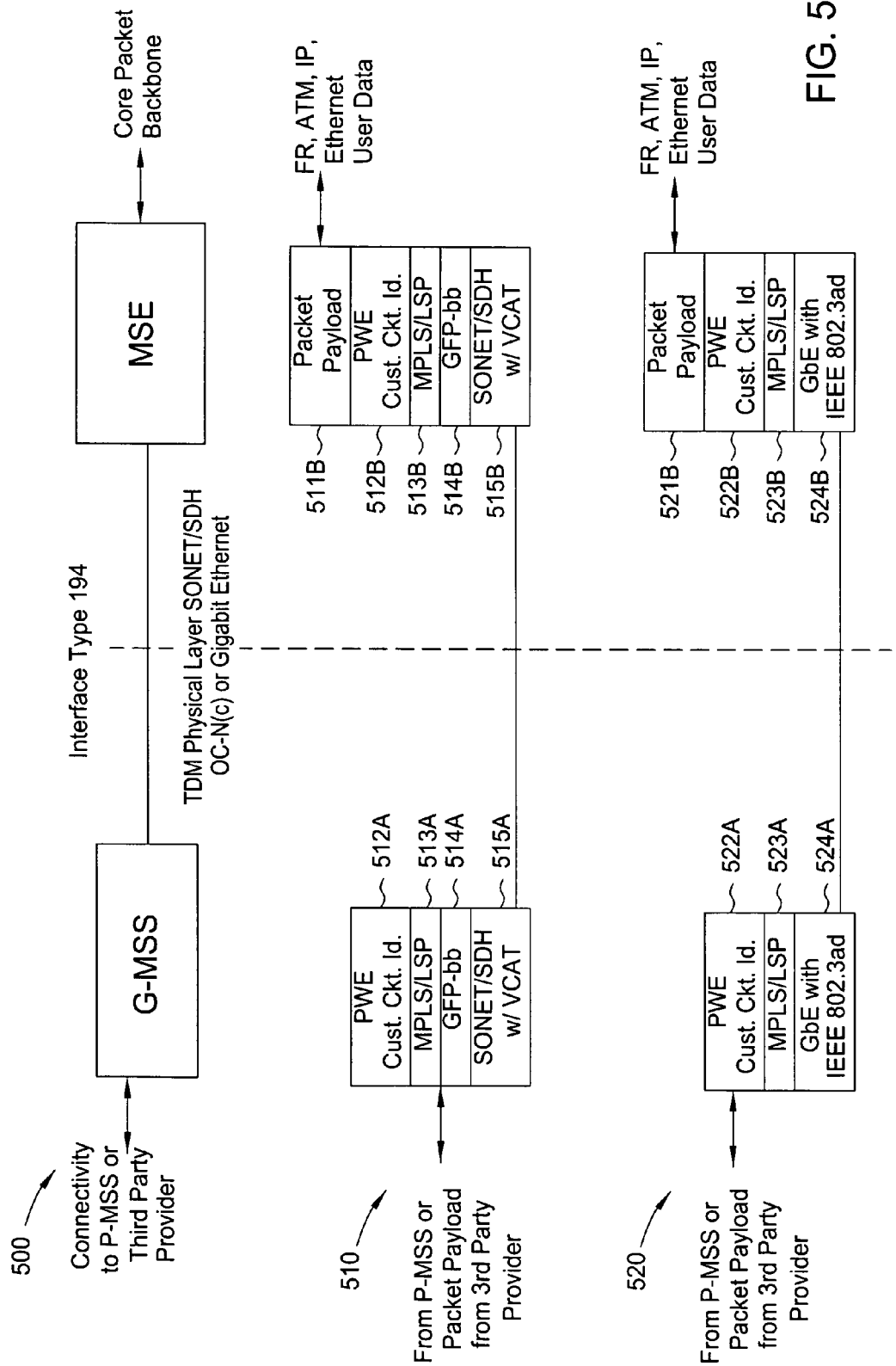
FIG. 5 illustrates a protocol block diagram of an interface between a G-MSS and MSE.

FIG. 5, block diagram 500, shows the definition of interface type 194 between a G-MSS and a MSE. This interface consists either of a TDM interface, such as SONET OC-N(c), or a packet interface, such as Gigabit Ethernet, at the physical layer and only carries packet payload.

In the case of a SONET physical layer, interface 194 forwards a PWE encapsulated packet with customer ID information payload 512A from either a P-MSS or a third party access provider destined to a MSE in the direction from the G-MSS to the MSE, the G-MSS (optionally) encapsulates the PWE payload into a MPLS/LSP encapsulated packet 513A which further encapsulates it into a GFP based frame 514A and then encapsulates into a SONET physical layer with virtual concatenation support 515A. Once the user traffic arrives at the MSE, the MSE will terminate the SONET physical layer 515B and then extracts the GFP frames 514B and then (if provided) extracts the MPLS/LSP encapsulated packets 513B and then extracts the PWE packet with customer circuit ID information payload 512B and then extracts the packet payload 511B for further processing by the MSE. Note that the G-MSS relays a PWE VC that originates in a P-MSS or a G-MSS and terminates at a MSE or another P-MSS. In the reverse direction, the equivalent reverse functions are performed on this interface. The equivalent protocol stack of this scenario is shown in block diagram 510 in FIG. 5.

In the case of a Gigabit Ethernet link and physical layer with support of IEEE 802.3ad link aggregation, interface 194 forwards a PWE encapsulated packet with customer ID information payload 522A from either a P-MSS or a third party access provider destined to a MSE in the direction from the G-MSS to the MSE, the G-MSS encapsulates the packet payload in a PWE encapsulated packet with customer ID information payload 522A, (optionally) encapsulates the PWE payload into a MPLS/LSP encapsulated packet 523A which further encapsulates it into a Gigabit Ethernet frame and physical layer supporting IEEE 802.3ad link aggregation 524A. Once the user traffic arrives at the MSE, the MSE will terminate the Gigabit Ethernet physical layer 524B and then extracts the Gigabit Ethernet frames and then extracts the MPLS/LSP encapsulated packet 523B and then extracts the PWE packet with customer circuit ID information payload 522B and then (if provided) extracts the packet payload 521B for further processing by the MSE. Note that the G-MSS relays a PWE VC that originates in a P-MSS or a G-MSS and terminates at a MSE or another P-MSS. In the reverse direction, the equivalent reverse functions are performed on this interface. The equivalent protocol stack of this scenario is shown in block diagram 520 in FIG. 5.

Figure 6:
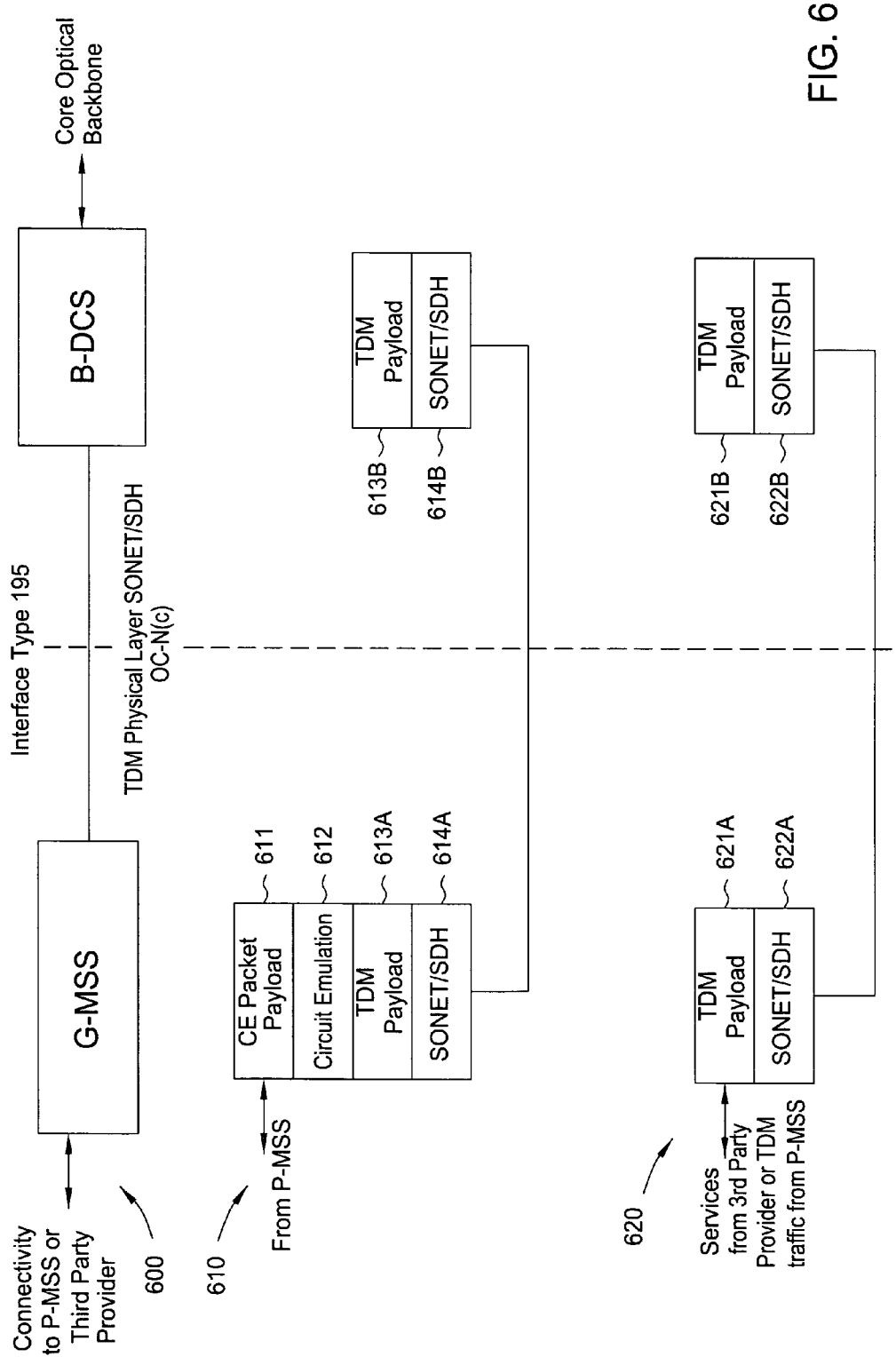
FIG. 6 illustrates a protocol block diagram of an interface between a G-MSS and B-DCS.

FIG. 6, block diagram 600, shows the definition of interface type 195 between a G-MSS and a B-DCS. This interface consists of a TDM interface, such as SONET OC-N(c), at the physical layer and only carries TDM payload.

If interface 195 carries circuit emulated packet payload 611A, typically from a P-MSS, the G-MSS will perform a reverse circuit emulation function 612A to extract the TDM user payload 613A and then maps it into a TDM physical layer 614A in the direction from the G-MSS to the B-DCS. The G-MSS performs the grooming function to aggregate multiple TDM circuits onto the TDM connection between the G-MSS and the B-DCS. When the user traffic arrives at the B-DCS, the B-DCS will terminate the TDM interface 614B to produce a TDM payload 613B for further processing by the B-DCS. In the reverse direction, the equivalent reverse functions are performed on this interface. The equivalent protocol stack of this scenario is shown in block diagram 610 in FIG. 6.

If interface 195 carries TDM user traffic 621A, typically from either a third party access provider or a P-MSS supporting TDM cross-connect, using a TDM physical layer 622A in the direction from the G-MSS to the B-DCS, the B-DCS will terminate the TDM interface 622B to produce a TDM payload 621B for further processing by the B-DCS before it is forwarded into the core optical backbone for transport. In the reverse direction, the equivalent reverse functions are performed on this interface. The equivalent protocol stack of this scenario is shown in block diagram 620 in FIG. 6.

FIG. 7, block diagram 700, shows the definition of interface type 196 between a P-MSS connected to a CP-MSP and another P-MSS connected to a CP-MSP. This interface consists of a TDM interface, such as a SONET OC-N ring with virtual concatenation support, at the physical layer and carries either packet user data or traditional user TDM traffic. The MAC layer could be RPR. Although other instantiations are possible, RPR is used for the encapsulation and transport of the user data over the SONET ring in block diagram 700.

If interface 196 carries user packet payload from an originating P-MSS to a destination P-MSS within a single P-MSS ring, the originating P-MSS encapsulates the user packet payload 711A, such as ATM, Frame Relay, Ethernet, IP, or circuit emulated packet payload, into a PWE packet with customer circuit ID information payload 712A and then further encapsulates it a RPR packet 713A and then further encapsulates it into a GFP frame 714A and then encapsulates it into a SONET physical layer with virtual concatenation support 715A. Note that this would primarily apply to Ethernet connectivity (point-to-point or TLAN services, as described earlier). For example, it would not do IP address forwarding and routing, i.e., this embodiment is not Layer 3 aware. Once the user traffic arrives at the destination P-MSS, the destination P-MSS will terminate the SONET physical layer with virtual concatenation support 715B and extracts the GFP frame 714B and then extracts the RPR packet 713B and then extracts the PWE packet with customer circuit ID information payload 712B and then extracts the user packet payload 711B before it is forwarded to the destination CP-MSP. Note that a PWE VC is established between the originating P-MSS and the destination P-MSS to transport user packet or CE packet payload within a single P-MSS ring. In the reverse direction, the equivalent reverse functions are performed on this interface. The equivalent protocol stack of this scenario is shown in block diagram 710 in FIG. 7.

If interface 196 carries clear channel TDM user traffic 721A, such as clear channel DS1 or DS3, using a TDM physical layer 722A in the direction from an originating P-MSS connected to a CP-MSP to a destination P-MSS connected to another CP-MSP, the destination P-MSS will terminate the TDM interface 722B to produce a TDM payload 721B to be forwarded to the destination CP-MSP. In the reverse direction, the equivalent reverse functions are performed on this interface. The equivalent protocol stack of this scenario is shown in block diagram 720 in FIG. 7.

To further illustrate the present invention using the communications network shown in FIG. 1, a plurality of PATN access circuits 181 to 183 can be deployed according to the network architecture 100. The circuit path information pertaining to each circuit is provided in Table 1.

TABLE 1

| Circuit | Sequence of network devices traversed by the metro circuit | Circuit Characteristics |
| --- | --- | --- |
| 181 | 101, 111, 112, 121, 131 | Frame Relay, PIR = 256 kbps |
| 182 | 151, 152, 121, 131 | Frame Relay, PIR = 512 kbps |
| 183 | 102, 111, 112, 121, 141 | Private Line, Clear Channel DS3 |

Circuit 181, a Frame Relay service, originates at CP-MSP 101 and is connected to P-MSS 111 via a DS1, using interface type 191 shown in protocol block diagram 210 in FIG. 2. The Frame Relay circuit uses 4 DS0 channels within the DS1 link because it has a peak information rate of 256 kbps. P-MSS 111 performs packet extraction and IPS to extract Frame Relay packets from the four DS0 channels within the DS1 link for circuit 181. Then the P-MSS 111 performs idle packet suppression for the Frame Relay packet stream and the resulting user packet payload stream will be transported between the P-MSS 111 and the MSE 131 using a PWE VC containing relevant customer circuit ID information. The PWE VC originates in P-MSS 111, traverses G-MSS 121, and terminates in MSE 131. The protocol processing between P-MSS 111 and G-MSS 121, using interface type 192, is detailed in protocol block diagram 310 in FIG. 3. The protocol processing between G-MSS 121 and MSE 131, using interface type 194, is detailed in protocol block diagram 520 in FIG. 5. The PWE VC segment between P-MSS 111 and G-MSS 121 is transported over RPR over GFP over SONET ring supporting VCAT. The PWE VC segment between G-MSS 121 and MSE 131 is transported over a MPLS LSP over GFP over Gigabit Ethernet. The G-MSS 121 merely performs a PWE VC relay function between the P-MSS 111 and MSE 131. Note that circuit 181 is a Frame Relay circuit but PATN performs no Frame Relay switching or processing at all between P-MSS 111 and MSE 131. The PAIN merely provides packet transport for Frame Relay circuit 181 using a PWE VC within the PAIN. The actual Frame Relay processing only begins once circuit 181 enters the MSE 131. FIG. 8 further illustrates the protocol functions related to the PWE VC between P-MSS 111 and MSE 131 for circuit 181.

Circuit 182, a Frame Relay service, originates at a customer premise connected by a third party provider using DS1 access. The Frame Relay circuit uses 8 DS0 channels within the access DS1 link because it has a peak information rate of 512 kbps. The third party provider network 150 performs various level of TDM grooming at DCS 1/0 151 and W-DCS 152. The physical interface between the third party provider and the PAIN provider is a DS3 physical layer interface containing the 8 DS0 channels of circuit 182. G-MSS 121 performs deep channelization and packet extraction to extract Frame Relay packets from the eight DS0 channels within the DS3 link for circuit 182. Then the G-MSS 121 performs idle packet suppression for the Frame Relay packet stream and the resulted user packet payload stream will be transported between the G-MSS 121 and the MSE 131 using a PWE VC containing relevant customer circuit ID information. The PWE VC originates in G-MSS 121 and terminates in MSE 131. The protocol processing between G-MSS 121 and MSE 131, using interface type 194, is detailed in protocol block diagram 520 in FIG. 5. The PWE VC segment between G-MSS 121 and MSE 131 is transported over a MPLS LSP over Gigabit Ethernet. Note that circuit 182 is a Frame Relay circuit but PATN performs no Frame Relay switching or processing at all between G-MSS 121 and MSE 131. The PATN merely provides packet transport for Frame Relay circuit 182 using a PWE VC within the PATN. The actual Frame Relay processing only begins once circuit 182 enters the MSE 131.

Circuit 183, a Private Line service, originates at CP-MSP 102 and is connected to P-MSP 111 via a clear channel DS3 using interface type 191 shown in protocol block diagram 230 in FIG. 2. Circuit 183 uses the entire clear channel DS3 since it is a DS3 Private Line service. P-MSS 111 performs DS3 TDM grooming and then forwards the TDM payload to G-MSS 121 using interface type 192 shown in protocol block diagram 320 in FIG. 3. Then the G-MSS 121 performs the necessary DS3 TDM grooming and forwards the user TDM payload to B-DCS 141 using interface type 195 shown in protocol block diagram 620. For circuit 183, the PATN provides the necessary TDM grooming support from P-MSS 111 via P-MSS 112 and G-MSS 131 to B-DCS 141. The B-DCS 141 will further groom circuit 183 into the core optical transport network and forward the DS3 clear channel TDM payload to its destination. This is a scenario in which the traditional TDM access is supported by the PATN.

For those who are skilled in the art, the PATN architecture offers and supports a large and flexible number of combinations of interface connectivity using the various defined interface types and protocol block diagrams. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A transport network comprising:
a gateway-multi-service switch for supporting packet and time division multiplexing services;
a gateway-multi-service switch interface for providing time division multiplexing traffic and data packets to the gateway-multi-service switch, wherein the gateway-multi-service switch performs a deep channelization to suppress idle packets embedded in the data packets, wherein the deep channelization to suppress the idle packets comprises discarding the idle packets;
a second interface between the gateway-multi-service switch and a multi-service edge for handing off the data packets without the idle packets, wherein the second interface provides the functions of:
receiving a pseudo-wire encapsulation encapsulated packet with a customer identification information payload;
encapsulating the pseudo-wire encapsulation encapsulated packet with a customer identification information payload into a multi-protocol label switching/label switched path encapsulated packet;
encapsulating the multi-protocol label switching/label switched path encapsulated packet into a generalized framing protocol based frame; and
encapsulating the generalized framing protocol based frame into a synchronous optical network physical layer; and
a third interface between the gateway-multi-service switch and a broadband-digital crossconnect system for handing off the time division multiplexing traffic.

2. The network of claim 1, wherein the third interface between the gateway-multi-service switch and the broadband-digital crossconnect system provides at least one of the following functions:
receiving a circuit emulated packet payload;
performing a reverse circuit emulation function on the circuit emulated packet payload to generate a time division multiplexing user payload; and
mapping the time division multiplexing user payload into a time division multiplexing physical layer.

3. The network of claim 1, further comprising a fourth interface between the gateway-multi-service switch and a time division multiplexing access network.

4. The network of claim 3, wherein the fourth interface between the gateway-multi-service switch and the time division multiplexing access network provides at least one of the following functions:
terminating a time division multiplexing physical layer; and
performing an idle packet suppression to produce a packet payload.

5. The network of claim 3, wherein the fourth interface between the gateway-multi-service switch and the time division multiplexing access network provides at least one of the following functions:
terminating a time division multiplexing physical layer to extract a time division multiplexing traffic payload;
performing a deep channelization to produce a time division multiplexing stream; and
performing a circuit emulation on the time division multiplexing stream to produce a circuit emulated packet payload.

6. The network of claim 1, further comprising:
a packet-multi-service switch; and
a packet-multi-service switch interface for providing at least-one of the data packets and time division multiplexing traffic to the packet-multi-service switch.

7. The network of claim 6, wherein the packet-multi-service switch interface comprises an interface between the gateway-multi-service switch and the packet-multi-service switch.

8. The network of claim 7, wherein the interface between the gateway-multi-service switch and the packet-multi-service switch provides at least one of the following functions:
receiving a packet payload or a circuit emulated packet payload;
performing a pseudo wire encapsulation on the packet payload or the circuit emulated packet payload to generate a pseudo wire encapsulation encapsulated packet with the packet payload or the circuit emulated packet payload;
encapsulating the pseudo wire encapsulation encapsulated packet with the packet payload or the circuit emulated packet payload into a resilient packet ring packet;
encapsulating the resilient packet ring packet into a generalized framing protocol based frame with the resilient packet ring packet; and
encapsulating the generalized framing protocol based frame with the resilient packet ring packet into a synchronous optical network physical layer.

9. The network of claim 7, wherein the interface between the gateway-multi-service switch and the packet-multi-service switch provides at least one of the following functions:
terminating a synchronous optical network physical layer;
extracting a generalized framing protocol based frame from the synchronous optical network physical layer;
extracting a resilient packet ring packet from the generalized framing protocol based frame that is extracted from the synchronous optical network physical layer;
extracting a pseudo wire encapsulation encapsulated packet from the resilient packet ring packet; and
extracting a circuit emulated packet payload from the pseudo wire encapsulation encapsulated packet that is extracted from the resilient packet ring packet.

10. The network of claim 6:
wherein the packet-multi-service switch comprises two packet-multi-service switches;
wherein the packet-multi-service switch interface comprises an interface between the two packet-multi-service switches; and
wherein the interface between the two packet-multi-service switches provides at least one of the following functions:
receiving a packet payload or a circuit emulated packet payload;
performing a pseudo wire encapsulation on the packet payload or the circuit emulated packet payload to generate a pseudo wire encapsulation encapsulated packet with the packet payload or the circuit emulated packet payload;
encapsulating the pseudo wire encapsulation encapsulated packet with the packet payload or the circuit emulated packet payload into a resilient packet ring packet;
encapsulating the resilient packet ring packet into a generalized framing protocol based frame with the resilient packet ring packet; and encapsulating the generalized framing protocol based frame with the resilient packet ring packet into a synchronous optical network physical layer.

11. The network of claim 6:
wherein the packet-multi-service switch interface comprises an interface between the packet-multi-service switch and a customer premise-multi service platform; and
wherein the interface between the packet-multi-service switch and the customer premise-multi service platform provides at least one of the following functions:
terminating a time division multiplexing physical layer;
performing a deep channelization to extract user data packets from the time division multiplexing physical layer; and
performing an idle packet suppression to produce a packet payload.

12. A method for providing a transport network, comprising:
providing a gateway-multi-service switch for supporting packet and time division multiplexing services;
providing a gateway-multi-service switch interface for providing time division multiplexing traffic and data packets to the gateway-multi-service switch, wherein the gateway-multi-service switch performs a deep channelization to suppress idle packets embedded in the data packets, wherein the deep channelization to suppress the idle packets comprises discarding the idle packets;
providing a second interface between the gateway-multi-service switch and a multi-service edge for handing off the data packets without the idle packets, wherein the second interface provides the functions of:
receiving a pseudo-wire encapsulation encapsulated packet with a customer identification information payload;
encapsulating the pseudo-wire encapsulation encapsulated packet with a customer identification information payload into a multi-protocol label switching/label switched path encapsulated packet;
encapsulating the multi-protocol label switching/label switched path encapsulated packet into a generalized framing protocol based frame; and
encapsulating the generalized framing protocol based frame into a synchronous optical network physical layer; and
providing a third interface between the gateway-multi-service switch and a broadband-digital crossconnect system for handing off the time division multiplexing traffic.

13. The method of claim 12, wherein the third interface between the gateway-multi-service switch and the broadband-digital crossconnect system provides at least one of the following functions:
receiving a circuit emulated packet payload;
performing a reverse circuit emulation function on the circuit emulated packet payload to generate a time division multiplexing user payload; and
mapping the time division multiplexing user payload into a time division multiplexing physical layer.

14. The method of claim 12, further comprising a fourth interface between the gateway-multi-service switch and a time division multiplexing access network, wherein the fourth interface between the gateway-multi-service switch and the time division multiplexing access network provides at least one of the following functions:
terminating a time division multiplexing physical layer; and
performing an idle packet suppression to produce a packet payload.

15. The method of claim 12, further comprising:
providing a packet-multi-service switch;
providing a packet-multi-service switch interface for providing at least one of the data packets and time division multiplexing traffic to the packet-multi-service switch, wherein the packet-multi-service switch interface comprises an interface between the gateway-multi-service switch and the packet-multi-service switch, wherein the interface between the gateway-multi-service switch and the packet-multi-service switch provides at least one of the following functions:
receiving a packet payload or a circuit emulated packet payload;
performing a pseudo-wire encapsulation on the packet payload or the circuit emulated packet payload to generate a pseudo-wire encapsulation encapsulated packet with the packet payload or the circuit emulated packet payload;
encapsulating the pseudo-wire encapsulation encapsulated packet with the packet payload or the circuit emulated packet payload into a resilient packet ring packet;
encapsulating the resilient packet ring packet into a generalized framing protocol based frame with the resilient packet ring packet; and
encapsulating the generalized framing protocol based frame with the resilient packet ring packet into a synchronous optical network physical layer.

16. The method of claim 12, further comprising:
providing a packet-multi-service switch;
providing a packet-multi-service switch interface for providing at least one of the data packets and time division multiplexing traffic to the packet-multi-service switch, wherein the packet-multi-service switch interface comprises an interface between the gateway-multi-service switch and the packet-multi-service switch, wherein the interface between the gateway-multi-service switch and the packet-multi-service switch provides at least one of the following functions:
terminating a synchronous optical network physical layer;
extracting a generalized framing protocol based frame from the synchronous optical network physical layer;
extracting a resilient packet ring packet from the generalized framing protocol based frame that is extracted from the synchronous optical network physical layer;
extracting a pseudo-wire encapsulation encapsulated packet from the resilient packet ring packet; and
extracting a circuit emulated packet payload from the pseudo-wire encapsulation encapsulated packet that is extracted from the resilient packet ring packet.

17. The method of claim 12, further comprising:
providing a plurality of packet-multi-service switches;
providing a packet-multi-service switch interface for providing at least one of the data packets and time division multiplexing traffic to the packet-multi-service switch, wherein the packet-multi-service switch interface comprises an interface between the plurality of packet-multi-service switches, wherein the interface between the plurality of packet-multi-service switches provides at least one of the following functions:
receiving a packet payload or a circuit emulated packet payload;
performing a pseudo-wire encapsulation on the packet payload or the circuit emulated packet payload to generate a pseudo-wire encapsulation encapsulated packet with the packet payload or the circuit emulated packet payload;

encapsulating the pseudo-wire encapsulation encapsulated packet with the packet payload or the circuit emulated packet payload into a resilient packet ring packet;

encapsulating the resilient packet ring packet into a generalized framing protocol based frame with the resilient packet ring packet; and encapsulating the generalized framing protocol based frame with the resilient packet ring packet into a synchronous optical network physical layer.

18. The method of claim 12, further comprising:

providing a packet-multi-service switch;

providing a packet-multi-service switch interface for providing at least one of the data packets and time division multiplexing traffic to the packet-multi-service switch, wherein the packet-multi-service switch interface comprises an interface between the packet-multi-service switch and a customer premise-multi-service platform, wherein the interface between the packet-multi-service switch and the customer premise-multi-service platform provides at least one of the following functions:

terminating a time division multiplexing physical layer;

performing a deep channelization to extract user data packets from the time division multiplexing physical layer; and performing an idle packet suppression to produce a packet payload.

* * * * *